United States Patent
Cretin et al.

(10) Patent No.: US 8,293,357 B2
(45) Date of Patent: Oct. 23, 2012

(54) POWER TRANSMISSION BELT

(75) Inventors: Jean-Loup Cretin, Marzy (FR); Julie Rognon, Saint Cyr sur Loire (FR); Denis Tricoche, Jour-les-Tours (FR); Hervé Varin, Joue-les-Tours (FR)

(73) Assignee: Hutchinson, Paris (FR)

( * ) Notice: Subject to any disclaimer, the term of this patent is extended or adjusted under 35 U.S.C. 154(b) by 686 days.

(21) Appl. No.: 12/354,379

(22) Filed: Jan. 15, 2009

(65) Prior Publication Data

US 2010/0075793 A1  Mar. 25, 2010

(30) Foreign Application Priority Data

Sep. 23, 2008 (FR) .................. 08 05236

(51) Int. Cl.
| B32B 3/00 | (2006.01) |
| F16G 1/00 | (2006.01) |
| F16G 5/00 | (2006.01) |
| F16G 9/00 | (2006.01) |
| F16G 1/04 | (2006.01) |

(52) U.S. Cl. ...... 428/172; 428/156; 428/167; 428/295.1; 428/297.4; 474/260; 474/263; 474/264; 474/266; 474/267; 474/268; 156/138; 156/140

(58) Field of Classification Search .......... 428/156, 428/172, 167, 295.1, 297.4, 299.7; 474/260, 474/263, 264, 266, 267, 268, 271; 156/138, 156/140

See application file for complete search history.

(56) References Cited

U.S. PATENT DOCUMENTS

| 3,964,328 A | 6/1976 | Redmond, Jr. |
| 5,120,280 A * | 6/1992 | Mizuno et al. ............... 474/260 |
| 6,443,866 B1 * | 9/2002 | Billups ....................... 474/260 |
| 7,128,674 B2 | 10/2006 | Teves et al. |
| 2004/0048708 A1 | 3/2004 | Nonnast et al. |
| 2007/0249452 A1 * | 10/2007 | South ......................... 474/263 |
| 2008/0132370 A1 * | 6/2008 | Goettsch et al. ............. 474/268 |
| 2008/0207371 A1 * | 8/2008 | Dieudonne et al. .......... 474/263 |

FOREIGN PATENT DOCUMENTS

| EP | 0 549 401 | 6/1993 |
| EP | 1 154 171 | 11/2001 |
| EP | 1 180 615 A2 | 2/2002 |
| EP | 1 696 150 | 8/2006 |
| JP | 2007 170454 | 7/2007 |
| JP | 2007170454 A * | 7/2007 |
| WO | WO 2007/099233 | 9/2007 |

OTHER PUBLICATIONS

Search Report for French Application No. 08 05236, filed Sep. 23, 2008.

* cited by examiner

*Primary Examiner* — Catherine A Simone
(74) *Attorney, Agent, or Firm* — Alston & Bird LLP

(57) ABSTRACT

The invention relates to a power transmission belt presenting elastomer teeth based on ethylene alpha olefin elastomer provided with an outer woven or non-woven covering. According to the invention the teeth are covered in a barrier layer, in particular of a thermoplastic material, and said outer covering, at least on the flanks of the teeth, is partially included in a portion of the thickness of the barrier layer.

18 Claims, 2 Drawing Sheets

POWER TRANSMISSION BELT

CROSS REFERENCE TO RELATED APPLICATIONS

This application claims priority from French Application No. 08 05236, filed Sep. 23, 2008.

FIELD OF THE INVENTION

The present invention provides a power transmission belt with teeth presenting an outline that includes a non-woven or woven fabric.

BACKGROUND OF THE INVENTION

Internal combustion engines rotate at a speed that varies almost sinusoidally about a nominal speed. This variation is associated with combustion occurring successively in the cylinders. This phenomenon is typical of internal combustion engines, it is referred to as "engine acyclism", and it is particularly significant when the compression ratio is high (diesel engine) and the number of cylinders is small. This acyclism in the engine speed is transmitted to accessories such as a water pump, power-assisted steering, air conditioning, an alternator, etc. . . . .

Some of these accessories, such as an alternator, possess high levels of inertia. Such inertia coupled with acyclism generates high dynamic torque levels. These torque levels are transformed into very great tension differences in a belt.

When a belt passes through tension levels that are too low, there may be sufficient instantaneous slip for the belt to slide, cease to drive, and be noisy.

When the belt possesses a coefficient of friction that is too high, a phenomenon can be observed that generates a significant level of noise by the belt sticking and then suddenly slipping (stick-slip noise).

A third phenomenon giving rise to noise is relative misalignment between two successive pulleys. This phenomenon is highly dependent on factors such as:

strand length;
nature of the materials (moduluses of the rubbers);
dimensions of the belt (thicknesses of its various layers); and
the coefficient of friction between the pulley and the blanks of the teeth of the belt.

The higher the coefficient of friction, the greater the level of noise.

The purpose of covering the teeth with a non-woven fabric is to reduce the coefficient of friction.

Known solutions consist in placing a non-woven fabric directly on a non-vulcanized blank, and then in forming a belt by vulcanization. Patents U.S. Pat. No. 4,747,812, U.S. Pat. No. 4,892,510, and EP 0 774 594 propose belts having teeth that are covered in a non-woven fabric that is molded and vulcanized thereon. By way of example, the non-woven fabric may be based on pulp and rayon.

U.S. Pat. No. 6,793,599 proposes a cellulose non-woven fabric molded on a fiber-loaded rubber constituting the teeth of the belt. U.S. Pat. No. 6,824,485 proposes infusing an elastomer compound in a non-woven fabric, the compound being the same as that constituting the teeth.

US patent application No. 2004/214675 proposes a belt having teeth covered in a woven or non-woven fabric, itself covered in a film of elastomer or plastomer having high ethylene content.

The methods described in the above-mentioned patents have the drawback that, during molding, the raw material of the tooth rubber passes through the non-woven fabric. The tooth rubber is therefore to be found on the surface, level with the fibers of the non-woven fabric where it can generate noise phenomena.

It is known that belts having tooth rubber based on ethylene alpha olefin (ethylene propylene terpolymer rubber (EPDM) or ethylene propylene rubber (EPM)) generate noise in particular on cold starting, when idling, or indeed when low temperatures are low in winter.

OBJECT AND SUMMARY OF THE INVENTION

The present invention proposes a belt and a method of fabricating it that enable this drawback to be avoided.

The invention thus provides a power transmission belt presenting elastomer teeth based on ethylene alpha olefin elastomer provided with an outer woven or non-woven covering, wherein the teeth are covered in an intermediate barrier layer, in particular of a thermoplastic material, and wherein said outer covering, at least on the flanks of the teeth, is partially included in a portion of the thickness of the barrier layer.

As explained below, the presence of this layer having a nature that is different from that of the teeth and that impregnates the outer covering in part only serves to form a barrier between the tooth rubber and the woven or non-woven fabric covering, while also ensuring that the assembly is mechanically strong.

It should be observed in particular that an elastomer based on ethylene alpha olefin is unsuitable for making the barrier layer, in particular because of its properties that are most unfavorable concerning noise.

The thickness of the barrier layer advantageously lies in the range 50 micrometers ($\mu m$) to 500 $\mu m$.

The barrier layer may be made of a thermoplastic elastomer (TPE)/vulcanized thermoplastic (TPV) that may present a thermoplastic matrix made of thermoplastic olefin (TPO), in particular a low density polyethylene (LDPE), and/or an elastomeric portion made of ethylene alpha olefin, in particular ethylene propylene terpolymer rubber (EPDM).

The barrier layer may be made of a thermoplastic olefin material, in particular high density polyethylene (HDPE), LDPE, or indeed polyolefin elastomer (POE).

The barrier layer may be based on polyethylene (PE), and it may present at least 30% by weight of said polyethylene, in particular LDPE, in particular having a molecular mass lying in the range 50,000 grams per mole (g/mole) to 200,000 g/mole.

The barrier layer may be made of a polyurethane varnish or of an adhesive, in particular a thermoplastic adhesive.

The outer covering may present weight lying in the range 20 grams per square meter ($g/m^2$) to 120 $g/m^2$, and more particularly in the range 30 $g/m^2$ to 90 $g/m^2$.

The outer covering may be included over 25% to 75%, and in particular over 50% and more particularly 30% of the thickness of the barrier layer.

Said elastomer based on ethylene alpha olefin may be an EPDM or an ethylene propylene rubber (EPM).

The invention also provides a method of fabricating a belt as defined above, wherein the method comprises:

a) applying said barrier layer and said woven or non-woven covering on a so-called active face of a non-vulcanized belt blank, said barrier layer preferably being made of a material that presents at the beginning of this step a 50% elongation force that is greater than that of the tooth elastomer in the raw state, or in other words the 50% elongation modulus of the barrier layer is greater than that of the teeth in the raw state;

b) vulcanizing the blank under pressure to mold a belt having its active face presenting teeth covered in succession in said barrier layer and in said covering.

The barrier layer is advantageously selected to have a said 50% elongation force (e.g. measured by traction testing at ambient temperature, i.e. 20° C., on test pieces of identical size), that is at least 5 times greater, and more particularly lies in the range 5 times to 30 times greater than that of the tooth elastomer in the raw state.

Preferably, the barrier layer and the outer covering are assembled together prior to molding, in particular by laminating before or after calendering, and rolling.

BRIEF DESCRIPTION OF THE DRAWINGS

The invention can be better understood on reading the following description with reference to FIGS. 1 and 2a showing an example of a K-type ribbed belt of the invention in section (FIG. 1) and in a detail section on a larger scale (FIG. 2b) of said FIG. 1, FIGS. 2a and 2b being photographs taken using a non-woven covering.

MORE DETAILED DESCRIPTION

Figure 1:
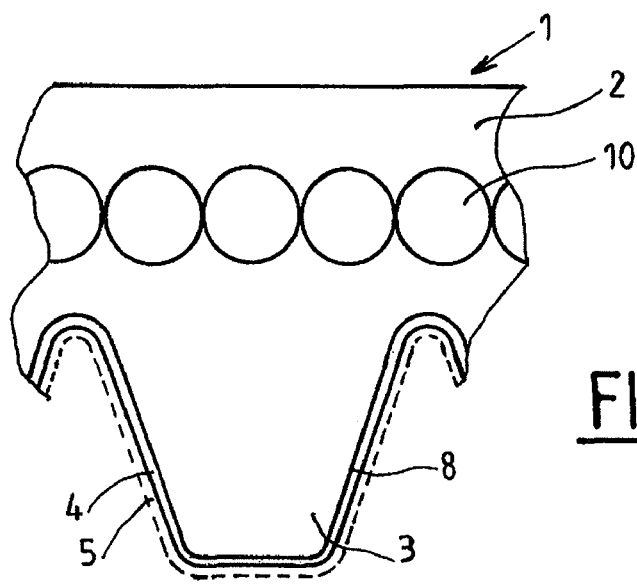

The ribbed belt 1 shown in FIG. 1 presents a dorsal layer 2 having embedded therein reinforcing yarns 10, e.g. of polyamide, and it also presents teeth 3, only one of which is shown. The teeth are made of a tooth rubber, which is here based on ethylene alpha olefin, in particular of EPDM or of EPM. The teeth 3 are covered in a barrier layer 4, e.g. a film of thermoplastic elastomer TPE/TPV.

The barrier layer 4 is of thickness lying in the range 50 µm to 500 µm, for example, and more particularly in the range 100 µm to 200 µm (or even 300 µm), and is preferably substantially equal to 150 µm, and it is covered by a non-woven covering 5 that is partially embedded in the layer 4, the assembly being bonded together during vulcanization of the belt.

The initial barrier layer 4 may be constituted in particular by a curable material that may be non-cured or at least cured in part only.

During molding, the barrier layer 4 constitutes a barrier to the tooth rubber in the raw state. The 50% elongation modulus of the film at the beginning of tooth formation is preferably greater than that of the raw tooth rubber, and in particular 5 to 30 times greater, and preferably 10 to 20 times greater. The barrier layer 4 adheres at 8 to the tooth rubber on the molded and vulcanized belt. Sufficient viscosity at the start-of-molding temperature can be obtained in particular with a thermoplastic film, or with adhesive, in particular a thermoplastic adhesive, or indeed with a polyurethane varnish.

With the invention, it is possible for the barrier layer to comprise a film 4 made of a thermoplastic elastomer of the TPE/TPV type in which the polymer matrix is a combination of a thermoplastic (TP) matrix and an elastomeric matrix, being partially or completely cured (V) thus forming a TPV, or uncured (E), thus forming a TPE. The elastomer (E/V) provides ability to withstand low temperatures and the thermoplastic TP provides relatively low noise and sealing. In the TPE/TPV matrix, there should be at least 25% by weight of elastomer if it is desired to have sufficient ability to withstanding low temperatures. Conversely, too much elastomer (more than 80% by weight) could lead to difficulties in working the complete film. For the elastomeric portion of the TPE/TPV film, an ethylene alpha olefin such as EPDM is particularly suitable. For the thermoplastic portion of the TPE/TPV film, thermoplastic olefins (TPOs) such as LDPE, PP, PE, and POE are suitable. LDPEs are preferred since they possess a slippery character, in particular.

It is preferable for the complete TPE/TPV film to be capable of curing during molding, e.g. with the action of peroxide or some other agent for curing the tooth rubber. This creates bonding with the ethylene alpha olefin, e.g. EPDM that constitutes the tooth rubber, and it encourages bonding between the elastomer film and the teeth.

Already designed for optimum bonding, such a film must, in order to constitute a barrier with the tooth rubber, nevertheless possess a coefficient of friction that is sufficient to ensure that in the event of the fibers of the non-woven covering 5 disappearing locally, relative immunity against noise is conserved even if the film is not intrinsically capable of withstanding severe conditions of use.

The film and the non-woven covering 5 may be assembled together beforehand, in particular by calendering and rolling.

The presence of the barrier layer 4, in particular made of thermoplastic, and more particularly TPO or of thermoplastic elastomer (TPE/TPV), makes it possible during vulcanization, e.g. with peroxide, for the non-woven fibers to penetrate only partially into the film 4, and in any event not to penetrate into the tooth rubber that goes from the raw state to the vulcanized state. The belt blank formed by a stack of layers of rubber having one face covered in the film 4 and a non-woven covering 5 is placed in a mold with pressure being applied to imprint the teeth and to vulcanize the belt. The vulcanization temperature is about 180° C. (it may lie in the range 150° C. to 200° C., approximately), and the film 4 softens, thereby enabling it firstly to pass at 4' through the mesh of the non-woven fabric 5 in order to bond with the fibers thereof, and secondly to adhere to the tooth rubber, in particular by co-crosslinking with the tooth rubber, thereby providing the assembly with mechanical cohesion.

Figure 2A:
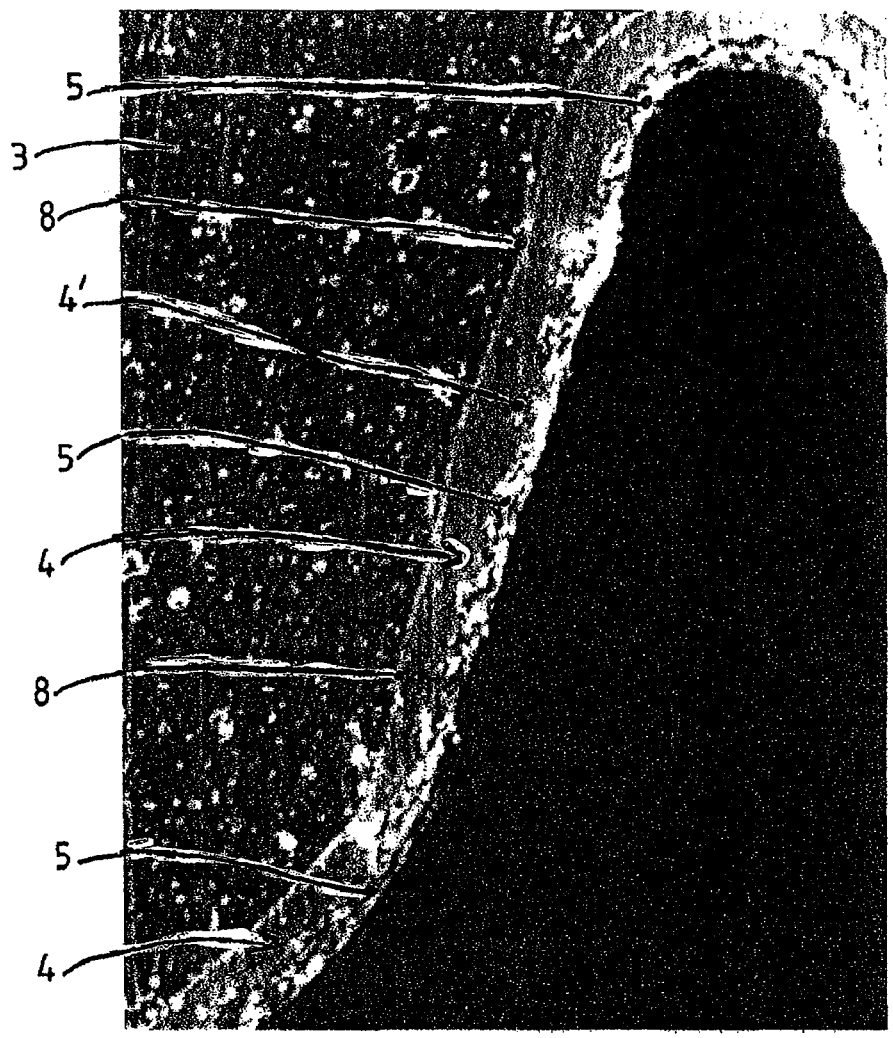
Figure 2B:
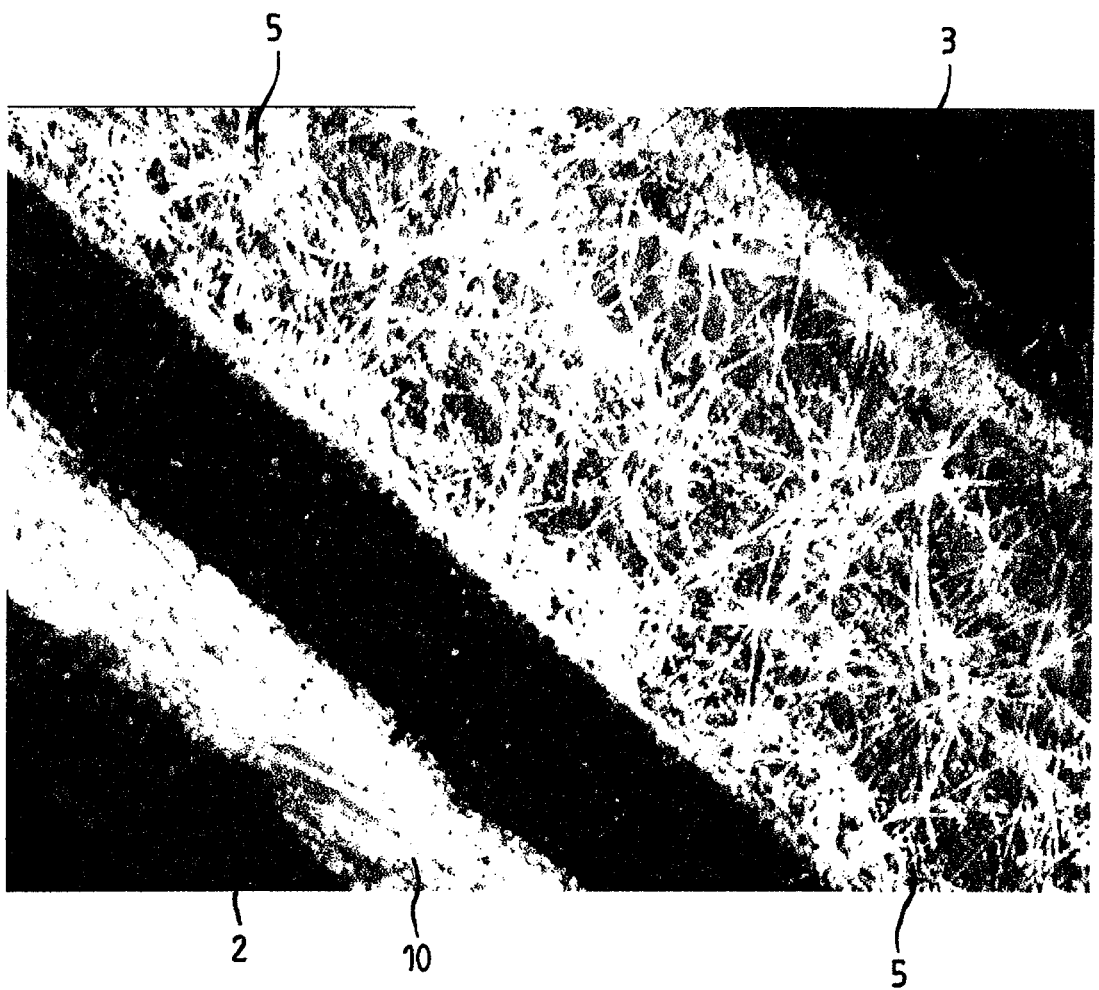

As shown in FIGS. 2a and 2b, the fibers 6 of the non-woven fabric 5 become partially overmolded in the film 4, thereby increasing the resistance of the fibers against being torn away. Each fiber is anchored at one end in the film 4, while its projecting end comes into contact with the flanks of the pulley while the belt is in use and serves to avoid the noise phenomenon. The same applies with a woven fabric. In FIG. 2a, the fibers of the non-woven fabric 5 penetrate into about 30% of the thickness (200 µm) of the barrier layer 4. In FIG. 2b, the presence of gray zones between the fibers (in white) of the non-woven fabric 5 show that the material of the barrier layer 4 has penetrated between the fibers so as to become adjacent to the outside surface of the teeth.

In other words, during molding and vulcanization, a portion of the covering 5 becomes partially overmolded in the film 4, thereby improving resistance to tearing out, and another portion lies at the outside on the surface, thereby encouraging noise reduction. Between the covering 5 and the tooth 3, the barrier layer 4 presents a region 4' having no fibers (or yarns if the fabric is woven).

The covering 5 advantageously possesses the lowest possible weight in order to satisfy noise requirements and in order to avoid exceeding a maximum weight at which it is possible, without difficulty, to mold the tooth together with the film as an underlayer. Weights lie in the range 20 g/m$^2$ to 120 g/m$^2$. Other things being equal, the denser the woven or non-woven fabric 5, the smaller the amount it penetrates into the barrier layer 4, the higher the modulus of the layer 4, and the less it penetrates through the fibers or the yarns of the layer 4. A layer 4 of relatively high modulus (e.g. high density PE) is therefore preferably associated with a low-weight covering, or else a layer 4 of relatively low modulus (e.g. POE) is preferably associated with fabric of greater weight (e.g. of the order of 100 g/m$^2$).

For a starting film that is uncured or partially cured, the extent of curing can be selected to adjust its viscosity and thus to adjust its modulus relative to the modulus of the material constituting the teeth.

Co-crosslinking between the barrier layer 4 and the tooth rubber is encouraged by the possible presence of polyethylene in the barrier layer 4.

Another type of film that is advantageous and that intrinsically presents anti-noise properties is based on polyethylene, in particular for example a film presenting at least 30% by weight of polyethylene and more particularly a film as described in patent application WO 2007/99233 in the name of the Applicant company, a film having at least 30% polyethylene, in particular low density polyethylene (LDPE) with molecular mass lying in particular in the range 50,000 g/mole to 200,000 g/mole.

As a result, even in the event of fibers 6 locally disappearing while the belt is being used, the film 4 ensures, by virtue of its own properties, relative immunity to noise.

A woven or non-woven fabric based on polyethylene (PE) is particularly suitable since it provides strong adhesion with the film forming the barrier layer during the molding and vulcanization operation, and it provides tribological characteristics that are suitable for low noise. The PE, i.e. the element that is common between the non-woven fabric and the film, encourages bonding between them. Nevertheless, during molding/vulcanization, a woven or non-woven fabric made of PE alone might lose its not perfectly plane mesh texture that is advantageous, in particular for managing noise phenomena when wet (e.g. as a result of condensation). The use of two-component fibers having PE on the outside, and an inside made of a material having a melting point that is higher than the molding temperature, i.e. higher than the temperature at which the teeth are vulcanized, serves to retain the texture of the non-woven fabric at the surface of the film. Materials such as polyethylene terephthalate (PET), polyamide (PA), or indeed aramid are well adapted to constructing the woven or non-woven fabric, and they satisfy these requirements. PE is then present as an outer coating of these materials.

Following molding/vulcanization, a portion of the woven or non-woven fabric is partially overmolded in the film, thereby increasing resistance to being torn away, and another portion lies at the outside on the surface, thereby encouraging noise reduction. A portion 4' of the barrier layer 4 does not have any non-woven fibers or woven yarn. The woven or non-woven fabric presents a minimum weight in order to satisfy noise requirements and it does exceed a maximum weight so as to make it possible without difficulty to mold the tooth together with the film in an underlayer. By way of example, a weight should be selected in the range 20 g/m$^2$ to 120 g/m$^2$.

This partial anchoring can also be obtained by selecting for the barrier layer a film or a layer (adhesive or varnish) that presents a modulus that is greater than the modulus of the tooth rubber in the raw state. With a varnish or a coating, the substance is allowed to dry or evaporate prior to performing molding/vulcanization.

The modulus of the barrier layer 4 is generally selected to lie in the range 5 times to 30 times greater than the modulus of the tooth material (generally EPDM or EPM) in the raw state.

The tooth rubber in the raw state is not sufficiently viscous and it passes through the woven or non-woven fabric while the teeth are being formed by molding in a mold (at ambient temperature at the beginning of the cycle). This leads to the effect known in the prior art, whereby, while the teeth are being formed, the ethylene alpha olefin of the teeth becomes lodged in the interstices of the woven or non-woven fabric. Interposing a layer or film 4 of higher modulus (higher force for 50% elongation), thereby forming a barrier layer, limits interpenetration during formation of the teeth. In other words, while the teeth are being formed under pressure, the barrier layer 4 pushes back the material 5 against the edge of the mold, without the yarns or fibers constituting it penetrating into the barrier layer 4. Thereafter, the blank is vulcanized (at about 180° C.) while pressure is maintained in the mold. The tooth rubber cures and acquires its final properties, while, under the effect of the high temperature, the layer 4 generally experiences a considerable reduction in its modulus, which reduction may, by way of indication, lie in the range 8 times to 25 times, and as a result the film then presents a modulus that is low enough to allow the yarns or fibers to become partially anchored in the barrier layer 4, while leaving a region 4' that does not have any yarns or fibers. On cooling, the barrier layer recovers its modulus, bonds to the vulcanized tooth rubber, and, except for a curable material such as a TPE/TPV film, recovers its modulus. Co-crosslinking therewith (fractions of polyethylene being present in the barrier layer) increases adhesion at the interface 8. Under such circumstances, the modulus of the barrier layer 4 increases as curing progresses.

The difference between a woven and non-woven fabric is that a woven fabric is based on yarns of greater length, whereas a non-woven fabric is made of fibers that are locally interlaced and bonded with one another and that present a length that lies for example in the range 10 millimeters (mm) to 50 mm, e.g. being 30 mm. In the context of the present invention, a non-woven fabric is preferred since it presents better properties during formation of the teeth by molding in the mold from a raw blank.

A film 4 having a composition of the TPE (LDPE)/TPV (EPDM) type associated with a non-woven fabric of weight lying in the range 30 g/m$^2$ to 90 g/m$^2$ with fibers presenting a coating of PE and a core of PET is particularly suitable.

The invention applies to ribbed belts (trapezoidal or V-grooved) and also to cog belts known as synchronous belts.

What is claimed is:

1. A power transmission belt presenting elastomer teeth based on ethylene alpha olefin elastomer provided with an outer woven or non-woven covering, wherein the teeth are covered in an intermediate barrier layer of a thermoplastic elastomer material having a polymer matrix which is a combination of a thermoplastic matrix and an elastomeric matrix, and wherein said outer covering, at least on the flanks of the teeth, is partially included in a portion of the thickness of the barrier layer, wherein the outer covering is included over 25% to 75% of the thickness of the barrier layer.

2. A belt according to claim 1, wherein the elastomeric matrix comprises an ethylene alpha olefin.

3. A belt according to claim 2, wherein said ethylene alpha olefin is EPDM.

4. A belt according to claim 1, wherein the thermoplastic matrix is made of a thermoplastic olefin.

5. A belt according to claim 4, wherein the thermoplastic olefin is a low-density polyethylene.

6. A belt according to claim 5, wherein the barrier layer includes at least 30% of said low density polyethylene.

7. A belt according to claim 6, wherein said low density polyethylene has a molecular mass lying in the range 50,000 g/mole to 200,000 g/mole.

8. A belt according to claim 1, wherein the thickness of the barrier layer lies in the range 50 μm to 500 μm.

9. A belt according to claim 1, wherein said tooth elastomer based on ethylene alpha olefin is an EPDM or an EPM.

10. A belt according to claim 1, wherein the outer covering is based on polyethylene.

11. A belt according to claim 1, wherein the outer covering presents a weight lying in the range 20 $g/m^2$ to 120 $g/m^2$.

12. A belt according to claim 1, wherein the outer covering presents a weight lying in the range 30 g/m2 to 90 $g/m^2$.

13. A belt according to claim 1, wherein the outer covering is included 50% of the thickness of the barrier layer.

14. A belt according to claim 1, wherein the outer covering is included 30% of the thickness of the barrier layer.

15. A method of fabricating a belt according to claim 1, wherein the method comprises:
   a) applying said barrier layer and said covering on a so-called active face of a non-vulcanized belt blank; and
   b) vulcanizing the blank under pressure to form by molding a belt having its active face presenting teeth covered in succession by said barrier layer and said woven or non-woven covering.

16. A method according to claim 15, wherein the barrier layer is made of a material that, during step a), presents a 50% elongation modulus that is at least 5 times greater and more particularly lies in the range 5 times to 30 times greater than the modulus of the tooth elastomer in the raw state.

17. A method according to claim 15, wherein the barrier layer and the outer covering are initially assembled together before molding, in particular by calendering and rolling.

18. A power transmission belt presenting elastomer teeth based on ethylene alpha olefin elastomer provided with an outer woven or non-woven covering, wherein the teeth are covered in an intermediate barrier layer of a thermoplastic elastomer material having a polymer matrix which is a combination of a thermoplastic matrix and an elastomeric matrix, and wherein said outer covering, at least on the flanks of the teeth, is partially included in a portion of the thickness of the barrier layer, and wherein the outer covering includes two-component yarns or fibers having an outside made of polyethylene and an inside made of a material having a melting point higher than the vulcanization temperature of the tooth elastomer.

* * * * *

UNITED STATES PATENT AND TRADEMARK OFFICE
CERTIFICATE OF CORRECTION

PATENT NO. : 8,293,357 B2
APPLICATION NO. : 12/354379
DATED : October 23, 2012
INVENTOR(S) : Cretin et al.

It is certified that error appears in the above-identified patent and that said Letters Patent is hereby corrected as shown below:

Title page,
(75) Inventors: "Denis Tricoche, Jour-les-Tours (FR)" should read
--Denis Tricoche, Joue-Les-Tours (FR)--.

Column 8,
Lines 1 and 2, "5 times greater and more particularly lies in the range 5 times to 30 times greater than" should read --5 times greater than--;
Line 6, cancel "in particular by calendering and rolling".

Signed and Sealed this
Twelfth Day of March, 2013

Teresa Stanek Rea
*Acting Director of the United States Patent and Trademark Office*